United States Patent
Fox et al.

(10) Patent No.: US 8,229,432 B2
(45) Date of Patent: Jul. 24, 2012

(54) CONTROLLING RESELECTION IN A TELECOMMUNICATIONS NETWORK

(75) Inventors: David Fox, Newbury (GB); Alessandro Goia, Ivrea (IT); John Turk, Newbury (GB)

(73) Assignee: Vodafone Intellectual Property Licensing Limited, Newbury, Berkshire (GB)

( * ) Notice: Subject to any disclaimer, the term of this patent is extended or adjusted under 35 U.S.C. 154(b) by 22 days.

(21) Appl. No.: 12/452,608

(22) PCT Filed: Jul. 10, 2008

(86) PCT No.: PCT/GB2008/002356
§ 371 (c)(1),
(2), (4) Date: May 5, 2010

(87) PCT Pub. No.: WO2009/007720
PCT Pub. Date: Jan. 15, 2009

(65) Prior Publication Data
US 2010/0240368 A1    Sep. 23, 2010

(30) Foreign Application Priority Data
Jul. 11, 2007    (GB) .................................. 0713391.1

(51) Int. Cl.
*H04W 4/00*    (2009.01)

(52) U.S. Cl. .................................. 455/435.3; 455/435.2

(58) Field of Classification Search ................ 455/435.2, 455/435.3
See application file for complete search history.

(56) References Cited

U.S. PATENT DOCUMENTS

| | | | |
|---|---|---|---|
| 7,634,272 B2 * | 12/2009 | Yamashita et al. | 455/444 |
| 2002/0197992 A1 | 12/2002 | Nizri et al. | |
| 2004/0109431 A1 | 6/2004 | Abrahamson et al. | |
| 2006/0111110 A1 * | 5/2006 | Schwarz et al. | 455/439 |
| 2006/0199591 A1 * | 9/2006 | Klatt | 455/450 |
| 2008/0268843 A1 * | 10/2008 | Ore et al. | 455/435.3 |
| 2008/0311924 A1 * | 12/2008 | Lucidarme | 455/452.1 |
| 2010/0130205 A1 * | 5/2010 | Jung et al. | 455/435.2 |
| 2010/0142498 A1 * | 6/2010 | Hyounhee | 370/337 |

(Continued)

FOREIGN PATENT DOCUMENTS

WO    WO01/43462 A2    6/2001

(Continued)

OTHER PUBLICATIONS

Nokia Siemens Networks, Nokia, "E-UTRA Measurements and Cell Reselection Considerations", 3GPP TSG-RAN WG2 Meeting #58bis, R2-072386, R2-071727, Jun. 25-29, 2007, pp. 1-5, XP002500401.

(Continued)

*Primary Examiner* — Nathan Mitchell
(74) *Attorney, Agent, or Firm* — Muirhead and Saturnelli, LLC

(57) ABSTRACT

A base station reselection method for a mobile terminal camped on a base station, which mobile terminal performs a cell reselection function in accordance with reselection parameters. The method characterized by according a different priority to respective radio resource types and varying the reselection parameters in dependence upon the radio resource type of the base station on which the mobile terminal is camped to cause the mobile terminal to preferentially reselect to a higher priority radio resource type when available. A further base station reselection method includes determining radio characteristics of at least one neighboring base station at a frequency, characterized by varying the frequency at which said radio characteristics are determined in dependence upon the rate of movement of the mobile terminal.

18 Claims, 2 Drawing Sheets

U.S. PATENT DOCUMENTS

2010/0304747 A1* 12/2010 Kazmi et al. .............. 455/436
2011/0130141 A1* 6/2011 Frost et al. ............... 455/436

FOREIGN PATENT DOCUMENTS

WO    WO2006/134027 A1    12/2006
WO    WO2008/047140 A1    4/2008

OTHER PUBLICATIONS

"Universal Mobile Telecommunications System (UMTS); User Equipment (UE) procedures in idle mode and procedures for cell reselection in connected mode (3GPP TS 25.304 version 7.1.0 Release 7)", ETSI TS 125 304, ETSI Standards, vol. 3-R2, No. V7.1.0, Dec. 1, 2006, XP014039981, ISSN: 0000-0001.

NEC, "UE specific intra E-UTRAN (inter-frequency) and inter-RAT cell reselection", 3GPP TSG-RAN2 Meeting #58bis, R2-072757, Jun. 25-29, 2007, pp. 1-5, XP002500402.

"Digital cellular telecommunications system (Phase 2+); Radio subsystem link control (3GPP TS 45.008 version 7.8.0 Release 7); ETSI TS 145 008", ETSI Standards, vol. 3-G1, No. V7.8.0, May 1, 2007, XP014038565, ISSN: 0000-0001.

"Digital cellular telecommunications system (Phase 2+); Radio link management in hierarchical networks (3GPP TS 45.022 version 6.0.0 Release 6); ETSI TS 145 022", ETSI Standards, vol. 3-G1, No. V6.0.0, Jan. 1, 2005, XP014028376, ISSN: 0000-0001.

3GPP TS 05.08 V8.23.0 (Nov. 2005), Technical Specification, "3rd Generation Partnership Project; Technical Specification group GSM/EDGE Radio Access Network; Radio subsystem link control (Release 1999)," 100 pp.

3GPP TS 23.236 V7.0.0 (Dec. 2006), Technical Specification, "3rd Generation Partnership Project; Technical Specification Group Services and System Aspects; Intra-domain connection of Radio Access Network (RAN) nodes to multiple Core Network (CN) nodes (Release 7)," 37 pp.

ETSI TS 125 331 V7.4.0 (Mar. 2007), Technical Specification, "Universal Mobile Telecommunications Systems (UMTS); Radio Resource Control (RRC); Protocol specification (3GPP TS 25.331 version 7.4.0 Release 7)," pp. 1-99.

* cited by examiner

CONTROLLING RESELECTION IN A TELECOMMUNICATIONS NETWORK

TECHNICAL FIELD

The present invention relates to a base station reselection method for a mobile terminal camped on a base station, which mobile terminal performs a cell reselection function in accordance with reselection parameters, and to a mobile terminal which camps on a base station in use and which mobile terminal performs a cell reselection function in accordance with reselection parameters.

BACKGROUND OF THE INVENTION

Mobile networks such as 2G (GSM), 3G (UMTS) and LTE telecommunications networks have an active state of communication with their mobile terminals and an inactive/idle state of communication with their terminals. When in the active state, as the mobile terminals move between different cells of the network, the communication session is maintained by performing a "handover" operation between the cells. In the inactive/idle state, as a mobile terminal moves between different cells of the network the mobile terminal performs "cell reselection" to select the most appropriate cell on which to "camp" in order that the mobile terminal can be paged by the network when mobile terminating data is destined for that mobile terminal.

Conventionally, generally speaking, the mobile terminal or network determines whether a handover/cell reselection procedure should be triggered in dependence upon measurements of the radio signals of the cells in the region of the mobile terminal. A filter is applied to the signals (either by the network or by the mobile terminal) which calculates an average (mean) value of these signals over a particular time period. This filtered/average values of the cells are then compared with each other. In dependence upon these comparisons, cell reselection/handover related procedures are triggered. This cell reselection/handover process generally comprises taking radio signal measurements of neighbouring cells and comparing these to each other and to the radio signal of the current cell to determine which cell provides the best signal strength/quality. Handover/reselection to the best cell can then occur.

In a mobile network operating in accordance with the 3G (UMTS) Standards, a mobile terminal device (UE) has a so-called "RRC (Radio Resource Control) state" which depends on its state of activity. In the respective RRC states different functions for mobility are executed. These functions are described in technical specification 3GPP TS 25.304/25.331.

For 2G and 3G, a mobile terminal is in active communication when it has a CS (Circuit Switched) connection established.

In 2.5G, GPRS PS (Packet Switched), active communication can be defined as the GPRS Ready state. In 3G UMTS PS, active communication can be defined as the RRC connected mode state that is CELL-DCH.

In 3G UMTS PS, CELL/URA_PCH and CELL_FACH can be defined as inactive states. In GPRS, the Standby state can be regarded as an inactive state.

Either one or both of the CS and PS active communications may occur in the mobile terminal.

For a 3G mobile terminal, in the active mode (and in CELL/URA_PCH and CELL_FACH) the terminal is in the RRC connected mode. The RRC connected mode includes the following states:

CELL_DCH state is characterized by:
A dedicated physical channel is allocated to the UE in uplink and downlink.
The UE is known on cell level according to its current active set
Dedicated transport channels, downlink and uplink (TDD) shared transport channels and a combination of these transport channels can be used by the UE.

CELL_FACH state is characterized by:
No dedicated physical channel is allocated to the UE.
The UE continuously monitors a FACH (forward access channel) in the downlink.
The UE is assigned a default common or shared transport channel in the uplink (e.g. RACH) that it can use anytime according to the access procedure for that transport channel.
The position of the UE is known by UTRAN on cell level according to the cell where the UE last made a cell update.
In TDD mode, one or several USCH or DSCH transport channels may have been established.

CELL_PCH state is characterized by:
No dedicated physical channel is allocated to the UE. The UE selects a PCH (paging channel) with the algorithm, and uses DRX for monitoring the selected PCH via an associated PCH.
No uplink activity is possible.
The position of the UE is known by UTRAN on cell level according to the cell where the UE last made a cell update in CELL_FACH state.

URA_PCH state is characterized by:
No dedicated channel is allocated to the UE. The UE selects a PCH, and uses DRX for monitoring the selected PCH via an associated PCH.
No uplink activity is possible.
The location of the UE is known on UTRAN routing area level according to the URA assigned to the UE during the last URA update in CELL-FACH state.

In the CELL_DCH state a network-driven handover is performed when necessary, as described in 3GPP TS 25-331. In this state a mobile terminal scans the pilot channels of up to 32 intra-frequency cells neighbouring its current cell. The mobile terminal forms a list of the best cells for possible handover based on the received signal strength and/or quality (i.e. the error rate in the received signal). The information in this list is passed to the UTRAN RNC on an event-driven basis, e.g. when the signal strength or signal-to-noise ratio of one of the cells exceeds a threshold. The information list is used by a handover algorithm implemented in the UTRAN RNC. The algorithm that determines when handover occurs is not specified in the GSM or UMTS Standards. The algorithms essentially trigger a handover when the mobile terminal provides a measurement of a neighbour cell received signal at the mobile terminal below a predetermined quality received threshold, which typically has a relation to the quality of the received signal from the serving cell (e.g. better quality by some margin).

In the "CELL_FACH", "CELL_PCH", "URA_PCH" or "idle mode" the mobile terminal may control its own mobility independently and starts a cell switch (reselection) when a neighbouring cell has a better quality than the current cell, as described in 3GPP TS 25.304. A similar procedure is also used in GSM/GPRS mobile networks, as described in technical specification 3GPP TS 05.08 (UE-based cell reselection).

In general, a mobile terminal in "idle mode" states and in RRC connected mode (inactive) states "CELL_FACH", "CELL_PCH" and "URA_PCH" performs periodic measurements of its own as well as of a series of neighbouring cells. Information from the neighbouring cells is broadcast in the system information block 11 (SIB11) or system information block 12 (SIB12) of the broadcast channel (BCH) as described in 3GPP TS 25.304 and 3GPP TS 25.331.

In order to avoid a cell switch based on short-term changes in the radio field conditions, so-called "fading", and the subsequent return to the original cell, a UMTS system mainly uses two parameters that are emitted in the Broadcast Channel (BCH) in the system information block 3 (SIB3) or system information block 4 (SIB4). Notably, these are the time interval "Treselection" and the hysteresis value "Qhyst". In order to avoid too fast a switch between cells based on quickly changing network conditions, a switch from the original ("serving") cell to the neighbouring ("target") cell only takes place if the neighbouring cell was better than the original cell by the factor "Qhyst" for the time "Treselection". The quality of the cells may be determined by measuring the Reference Signal Received Power (RSRP). This behaviour of a mobile end device is described in detail on the technical specification 3GPP TS 25.304. This can be expressed as:—

If RSRP(target cell)>RSRP(serving cell)+Qhyst,
RSRP THEN SELECT target cell

Multiple frequency layers and mobility state determination are provided in a similar manner for LTE/SAE networks.

Conventional access to the features and services provided by GSM and UMTS networks involves signalling between the mobile terminal and a standard base station (macro base station) that has a dedicated connection to an MSC and provides coverage in the cell occupied by the mobile terminal using cellular telecommunication (e.g. GSM or UMTS) transport protocols. There have recently been proposals to allow access to the features and services provided by GSM and UMTS networks by providing additional special base stations (femto base stations), referred to as access points (APs), for example at a subscriber's home or office, in order to increase network capacity and improve coverage. These access points communicate with the core network via IP based communications, such as a broadband IP network, and are typically routed via the Internet.

Many different names have been given to APs, such as home access points (HAPs), micro-base stations, pico-base stations, pico-cells and femto-cells, but all names refer to the same apparatus. APs provide short range, localized coverage, and are typically purchased by a subscriber to be installed in their house or business premises.

It has also been proposed to use APs in the LTE telecommunications network currently being developed, but not yet implemented.

An advantage of using an access point connected to the core network via an IP network is that existing broadband Digital Subscriber Line (DSL) connections can be used to link mobile terminals with the network core without using the capacity of the radio access network or transmission network of a mobile telecommunications network. In other words, the AP is integrated into a DSL modem/router and uses DSL to backhaul the traffic to the communication network.

A further advantage is that APs are able to provide mobile network access to areas where there is no radio access network coverage. Thus, they are expected to be particularly beneficial when installed in buildings with poor radio network coverage from the macro network but which have DSL connections. Additionally, an AP could provide UMTS coverage where there is no 3G coverage at all, perhaps only GSM coverage.

Handover and cell reselection are performed in the same way for APs. It is desirable for mobile terminals to provide continuous service when moving within an SAE/LTE coverage area and between an SAE/LTE and a UMTS coverage area/2G coverage area, and to/from APs.

Many mobile network systems in accordance with the UMTS standard are designed such that they use several frequencies and the development of the cells occurs in small cells ("micro-cells") and larger cells ("macro-cells"). In general, this type of arrangement is called "hierarchical cell structure" (HCS) in cellular networks. This arrangement is described in 3GPP TS 25.304.

In HCS slow-moving or stationary mobile terminals should be located in the smallest possible cells, such as micro-cells, while (faster) moving mobile terminals are preferably located in larger cells, such as macro-cells. This reduces the number of cell switches for faster moving mobile terminals. In order to identify whether a mobile terminal is moving or stationary, HCS uses the determination of the number of cell changes (parameter NCR) over a specified period of time (parameter TCR) as described, for example, in WO-A-2001043462.

Both parameters NCR and TCR are reported to the mobile terminal via the BCH (in SIB3 or 4) in each cell and the mobile terminal decides using the number of cell changes (NCR) in time period (TCR) whether it is in a so-called "low-mobility" or "high-mobility" state. If the mobile terminal is in a "low-mobility" state, it favours a cell change in smaller cells (micro-cells) and in a "high-mobility" state, it favours larger cells (macro-cells). The result of this behaviour is that the number of cell changes for fast-moving mobile end devices is minimised, whereby the capacity of the mobile network is maximised overall.

Each time a device changes cell it is required to read all the system information transmitted on the cell etc

SUMMARY OF THE INVENTION

According to a first aspect of the present invention, there is provided a base station reselection method for a mobile terminal camped on a base station, which mobile terminal performs a cell reselection function in accordance with reselection parameters, the method characterised by according a different priority to respective radio resource types and varying the reselection parameters in dependence upon the radio resource type of the base station on which the mobile terminal is camped to cause the mobile terminal to preferentially reselect to a higher priority radio resource type when available.

The radio resource types may include respective cell sizes. For example small pico/femto cells may be made available to certain subscribers in a Closed Subscriber Group. The radio resource types may include respective frequency layers and/or respective radio access technologies—e.g. GSM, UMTS, LTE, etc.

The relationship between the priorities and the radio resource types may be dependent upon the rate of movement of the mobile terminal. In the embodiments different priorities are assigned to a mobile device when it is stationary than when it is moving.

The relationship between the priorities and the radio resource types may be dependent upon the capabilities of the mobile terminals (e.g. whether the mobile terminal is able or likely to use particular types of service, such as high data rate service), and/or dependent upon the geographical location of the mobile terminal (e.g. whether the mobile terminal is in a remote location where particular radio access technologies are more likely to provide satisfactory service, such as GSM RAT in a remote location).

In the embodiment, the reselection parameters are such that the mobile terminal only reselects from a higher priority radio resource type to a lower priority radio resource type if the higher priority radio resource type is below an absolute quality threshold at the mobile terminal. The term "absolute" quality threshold herein, means a quality threshold that is defined independently of the quality of another base station. This is in contrast to the prior art, which uses a relative quality threshold (e.g. as described above: If RSRP (target cell)>RSRP (serving cell)+Qhyst,RSRP THEN SELECT target cell). The "absolute" quality threshold may however depend upon other parameters, such of the priority of the priority of radio resource type.

In the embodiment, the mobile terminal only reselects if the higher priority radio resource type is below the absolute quality threshold at the mobile terminal for a measurement period (Treselection), which measurement period is set in dependence upon the priority of the base station on which the mobile terminal is camped.

In the embodiment, the reselection parameters are such that the mobile terminal only reselects from a higher priority radio resource type to a lower priority radio resource type if the lower priority radio resource type is above an absolute quality threshold at the mobile terminal.

In the embodiment, the mobile terminal only reselects if the lower priority radio resource type is above the absolute quality threshold at the mobile terminal for a measurement period (Tmeasurement_long), which measurement period is set in dependence upon the priority of the base station on which the mobile terminal is camped.

In the embodiment, the reselection parameters are such that the mobile terminal only measures the quality of neighbouring base stations when the radio quality of the base station at the mobile terminal is below an absolute threshold (SinterSearch), which absolute threshold is set in dependence upon the priority of the base station on which the mobile terminal is camped.

In the embodiment, the reselection parameters are such that the mobile terminal searches for a higher priority radio resource type at a frequency, which frequency depends on the priority of the base station on which the mobile terminal is camped.

In the embodiment, the reselection parameters are such that the mobile terminal only reselects from a lower priority radio resource type to a higher priority radio resource type if the higher priority radio resource type is above an absolute quality threshold at the mobile terminal.

In the embodiment the quality threshold includes a hysteresis value which is varied in dependence upon the frequency with which the higher priority radio resource has been selected within a preceding time period. This advantageously reduces "ping-pong" between radio resource types. The quality threshold may depend on the priority of the base station on which the mobile terminal is camped.

According to a second aspect of the present invention, there is provided a base station reselection method for a mobile terminal camped on a base station, which mobile terminal performs a cell reselection function in accordance with reselection parameters, the method including determining radio characteristics of at least one neighbouring base station at a frequency, characterised by varying the frequency at which said radio characteristics are determined in dependence upon the rate of movement of the mobile terminal. In the embodiment, this method is used for intra-frequency reselection. In the embodiment, the frequency at which said radio characteristics are determined is higher when the rate of movement of the mobile terminal exceeds a threshold, and is lower when the rate of movement of the mobile terminal is below this threshold.

The system described herein also provides a mobile terminal which camps on a base station in use and which mobile terminal performs a cell reselection function in accordance with reselection parameters.

Accordingly, embodiments of the system described herein provide improved cell reselection as well as reduce the battery consumption of the device.

BRIEF DESCRIPTION OF THE DRAWINGS

For a better understanding of the present invention embodiments will now be described by way of example, with reference to the accompanying drawings, in which.

DETAILED DESCRIPTION OF VARIOUS EMBODIMENTS

Figure 1:
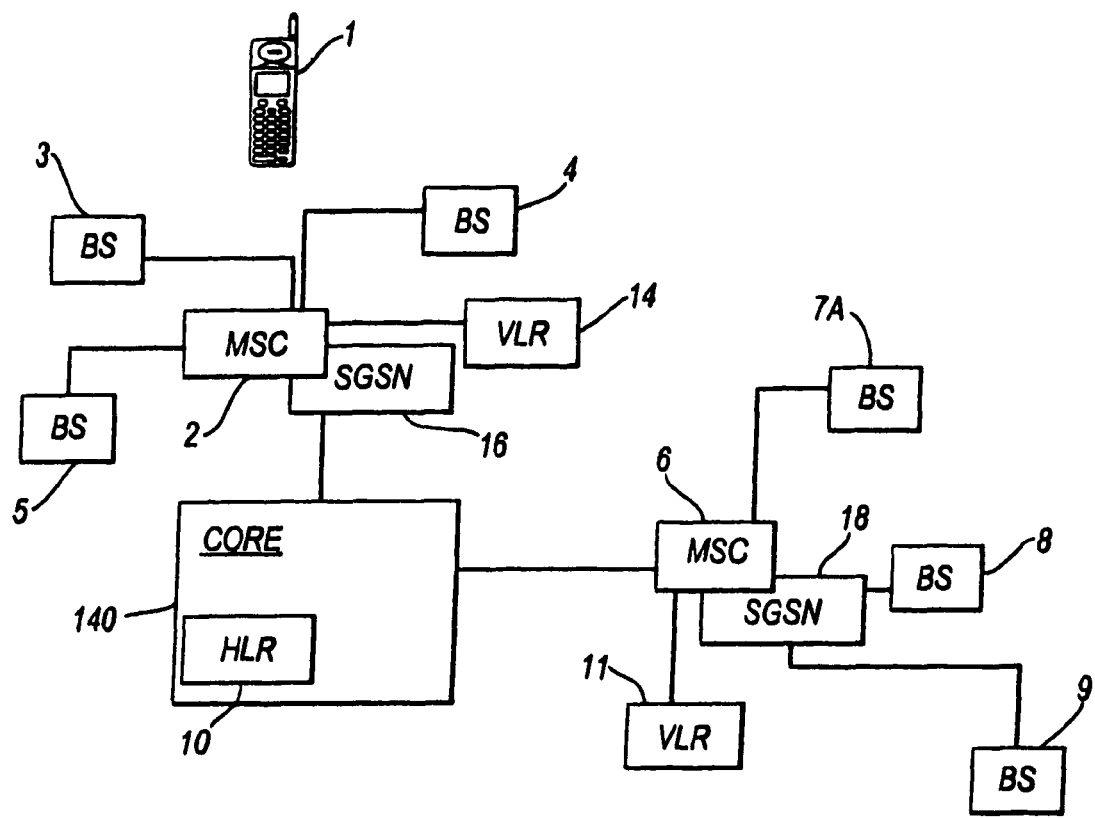
FIG. 1 is a diagrammatic drawing of key elements of a mobile telecommunications network.

Key elements of a mobile telecommunications network, and its operation, will now briefly be described with reference to FIG. 1.

Each base station (BS) corresponds to a respective cell of its cellular or mobile telecommunications network and receives calls from and transmits calls to a mobile terminal in that cell by wireless radio communication in one or both of the circuit switched or packet switched domains. Such a subscriber's mobile terminal is shown at 1. The mobile terminal may be a handheld mobile telephone, a personal digital assistance (PDA) or a laptop computer equipped with a datacard.

In a GSM mobile telecommunications network, each base station comprises a base transceiver station (BTS) and a base station controller (BSC). A BSC may control more than one BTS. The BTSs and BSCs comprise the radio access network.

In a UMTS mobile telecommunications network, each base station comprises a node B and a radio network controller (RNC). An RNC may control more than one node B. The node B's and RNC's comprise the radio access network.

In the proposed LTE mobile telecommunications network, each base station comprises an eNode B. The base stations are arranged in groups, and each group of base stations is controlled by a Mobility Management Entity (MME) and a User Plane Entity (UPE).

Conventionally, the base stations are arranged in groups and each group of base stations is controlled by one mobile switching centre (MSC), such as MSC 2 for base stations 3, 4 and 5. As shown in FIG. 1, the network has another MSC 6, which is controlling a further three base stations 7A, 8 and 9. In practice, the network will incorporate many more MSCs and base stations than shown in FIG. 1. The base stations 3, 4, 5, 7A, 8 and 9 each have dedicated (not shared) connection to their MSC 2 or MSC 6—typically a cable connection. This prevents transmission speeds being reduced due to congestion caused by other traffic.

The MSCs 2 and 6 support communications in the circuit switched domain—typically voice calls. Corresponding SGSNs 16 and 18 are provided to support communications in the packet switched domain such as GPRS data transmissions. The SGSNs 16 and 18 function in an analogous way to the MSCs 2 and 6. The SGSNs 16, 18 are equipped with an equivalent to the VLRs 11, 14 used in the packet switched domain.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) that is not visible on the card and is not known to the subscriber. The subscriber is issued with a publicly known number, that is, the subscriber's telephone number, by means of which callers initiate calls to the subscriber. This number is the MSISDN.

The network includes a home location register (HLR) 10 which, for each subscriber to the network, stores the IMSI and the corresponding MSISDN together with other subscriber data, such as the current or last known MSC or SGSN of the subscriber's mobile terminal.

When mobile terminal 1 is activated, it registers itself in the network by transmitting the IMSI (read from its associated SIM card) to the base station 3 associated with the particular cell in which the terminal 1 is located. In a traditional network, the base station 3 then transmits this IMSI to the MSC 2 with which the base station 3 is registered. In a network using the functionality described in 3GPP TS 23.236, the base station follows prescribed rules to select which MSC to use, and then transmits this IMSI to the selected MSC.

MSC 2 now accesses the appropriate storage location in the HLR 10 present in the core network 140 and extracts the corresponding subscriber MSISDN and other subscriber data from the appropriate storage location, and stores it temporarily in a storage location in a visitor location register (VLR) 14. In this way, therefore the particular subscriber is effectively registered with a particular MSC (MSC 2), and the subscriber's information is temporarily stored in the VLR (VLR 14) associated with that MSC.

Each of the MSCs of the network (MSC 2 and MSC 6) has a respective VLR (14 and 11) associated with it and operates in the same way as already described when a subscriber activates a mobile terminal in one of the cells corresponding to one of the base stations controlled by that MSC.

When the subscriber using mobile terminal 1 wishes to make a call, they enter the telephone number of the called party in the usual manner. This information is received by the base station 3 and passed on to MSC 2. MSC 2 routes the call towards the called party. By means of the information held in the VLR 14, MSC 2 can associate the call with a particular subscriber and thus record information for charging purposes.

The functionality just described may also apply to the proposed LTE mobile telecommunications network, with its eNode Bs performing the functionality of the base stations and the MME/UPE performing the functionality of the MSCs/VLRs. It is also to be appreciated that the functionality just described is one example of a network in which the embodiments of the invention may be implemented.

Figure 2:
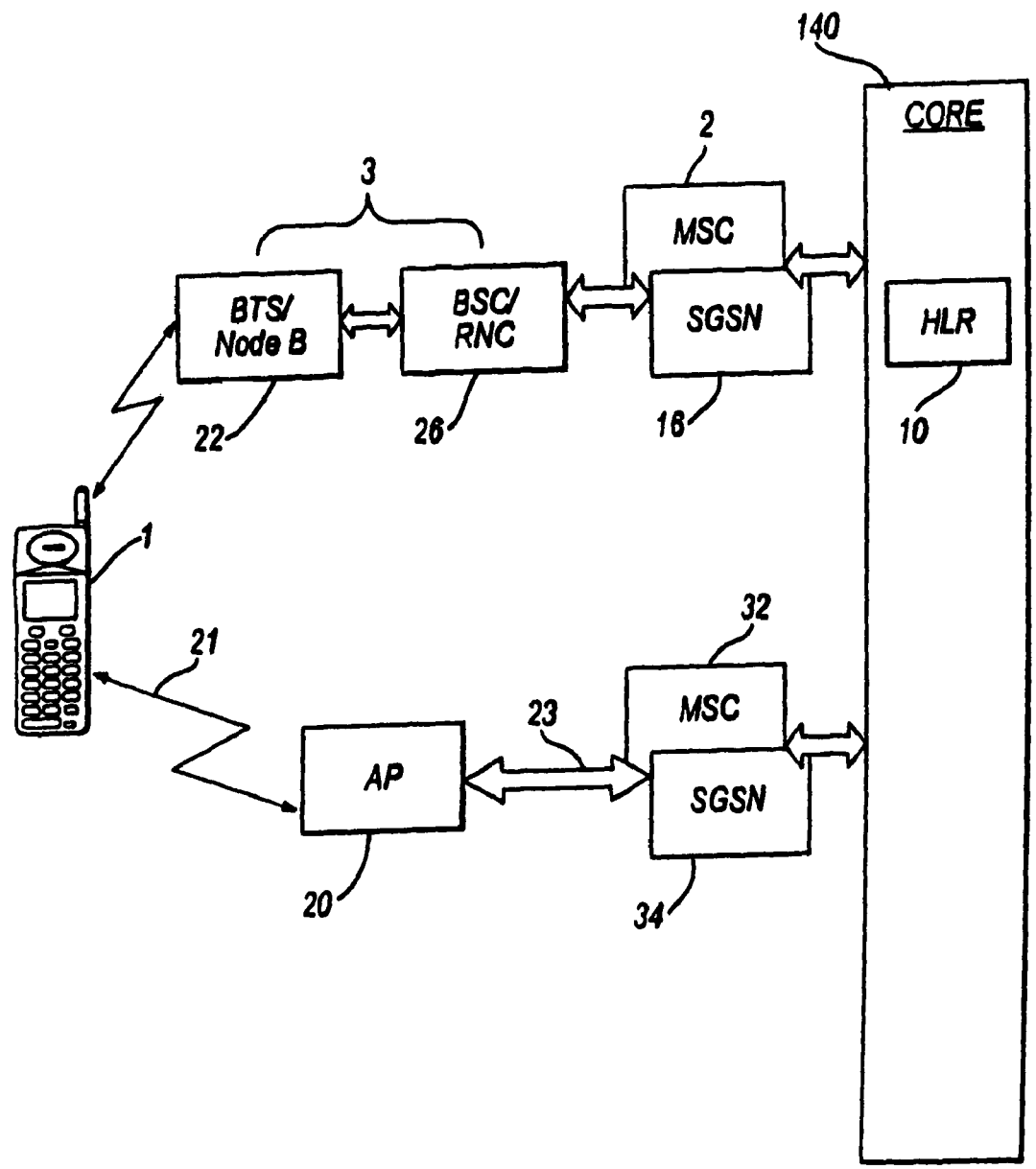
FIG. 2 shows a modified mobile telecommunications network for receiving IP based communications from an access point in addition to communications from a conventional base station.

FIG. 2 shows elements for providing access to a GSM or UMTS network by both a conventional base station 3 and an access point (AP 20). The AP 20 communicates with the mobile terminal 1 via a radio link 21.

The radio link 21 between the AP 20 and the mobile terminal 1 uses the same cellular telecommunication transport protocols as the conventional base station 3 but with a smaller range—for example 25 meters. The AP 20 appears to the mobile terminal 1 as a conventional base station, and no modification to the mobile terminal 1 is required to operate with the AP 20. The AP 20 performs a role corresponding to that of a GSM BTS 22 and BSC 26 and/or UMTS Node B and RNC and/or an LTE eNode B.

Communications 23 between the access point 20 and the core network 140 are IP based communications, and may be, for example, transmitted over a broadband IP network (and routed via the Internet). The communications are routed via MSC 32 or SGSN 34. The access point 20 converts the cellular telecommunications transport protocols used for signalling in conventional GSM or UMTS networks used between the mobile terminal 1 and the AP 20 to IP based signalling.

The connection 23 between the access point 20 and the core network 140 may use the PSTN telephone network. Typically a DSL cable connection connects the access point 20 to the PSTN network. The data is transmitted between the access point 20 and the core network 140 by IP transport/DSL transport (a backhaul connection).

The access point 20 may be connected to the core network 12 by means other than a DSL cable and the PSTN network. For example, the access point 20 may be connected to the core network 140 by a dedicated cable connection that is independent of the PSTN, or by a satellite connection between the access point 20 and the network core 140.

Using an access point 20 connected to the core network via an IP network does have advantages. Existing broadband DSL connections can be used to link mobile terminals with the network core 140 without using the capacity of the mobile telecommunications network radio access network, or where there is no conventional radio access network coverage. For example, UMTS coverage could be provided by an access point 20 where there is no conventional UMTS coverage (perhaps only GSM coverage).

AP 20 may be configured to serve a WLAN located in a home or office, in addition to GSM/UMTS/LTE networks. The WLAN could belong to the subscriber of the mobile terminal 1, or be an independently operated WLAN.

The owner of AP 20 can program the AP so that it is either "open" or "closed", whereby an open AP is able to carry communications from any mobile device in the GSM/UMTS network, and a closed AP is only able to carry communications from specific pre-designated mobile devices. Arrangements for controlling use of APs by mobile devices are disclosed in WO-A-2008 047140 ("Allowed AP").

The embodiment now to be described aims to provide an improved and more flexible reselection scheme. As discussed above, a switch from the original ("serving") cell to the neighbouring ("target") cell only takes place if the neighbouring cell was better than the original cell by the factor "Qhyst" for the time "Treselection". The quality of the cells may be determined by measuring the Reference Signal Received Power (RSRP). This can be expressed as:—

If RSRP(target cell)>RSRP(serving cell)+Qhyst,
RSRP THEN SELECT target cell

If Qhyst is increased by the serving cell, the mobile terminal 1 has a lower probability of selecting a neighbouring cell. If this value is decreased by the serving cell, the mobile terminal 1 has a higher probability of selecting a neighbouring cell.

The Sintersearch parameter is also used to control the reselection process. The Sintersearch information element is described in 3GPP TS 25.331 and 3GPP TS 25.304, and is sent in SIB3. Sintersearch controls whether the mobile device 1 must make measurements of inter-frequency cells while camped on a particular "serving cell". If the quality of the serving cell is above Sintersearch, then the UE will not measure other inter-frequency cells while camped.

The Sintersearch value is conventionally the same for all base stations (including APs) in a network.

If this value is increased, the mobile terminal 1 starts inter-frequency cell reselection earlier (i.e. when the quality of the serving cell is higher than conventionally). If this value is decreased by the serving cell, the mobile terminal starts inter-frequency cell reselection later (i.e. when the quality of the serving cell is lower than conventionally).

In the embodiment a plurality of Radio Access Technologies (RATs) are available, each having a plurality of frequency layers.

The mobility state of the mobile terminal (UE) is determined: whether the mobile terminal is stationary or non-stationary (moving). This determination may be made by any suitable means. For example, in order to identify whether a mobile terminal is moving or stationary, the determination of the number of cell changes (parameter NCR) over a specified period of time (parameter TCR) can be used as described, for example, in WO-A-2001043462.

Both parameters NCR and TCR are reported to the mobile terminal via the BCH in each cell and the mobile terminal decides using the number of cell changes (NCR) in time period (TCR) whether it is in a stationary or non-stationary (moving) state.

Alternatively, the mobility state may be determined by measuring the degradation of received pilot channel power within a given time period being above a threshold can be used; or the number of times new neighbour cells appear in the list of the best five neighbour cells within a given time period. Other methods are also possible.

A plurality of conventional base stations and/or access points may comprise a Closed Subscriber Group (CSG). CSG cells are only available for use by particular UEs. If the CSG cells are deployed on a number of frequencies then the UE needs to include these cells in the reselection process. The network may want to indicate a separate measurement control for this frequency layer to avoid unnecessary battery consumption and allow for the prioritisation of home cells or CSG cells even when these special cells share a frequency band with cells which do not have a CSG.

Intra-Frequency

When the UE is within one Frequency Layer, the UE measurement frequency and performance is dependent on mobility state, i.e. Stationary or Non-Stationary.

For the Non-Stationary UEs, the radio conditions and neighbour cells will vary quickly, and therefore the Intra-frequency measurement period is set smaller and reselection performance needs is higher.

For the Stationary UEs, the radio conditions vary slowly, and therefore the Intra-frequency measurement period can be higher and reselection performance can be lower.

The frequency of measurements of the serving cell and of the current highest ranked neighbour cells, and the frequency of the search for new neighbour cells (i.e. 1/period) and the required performance of measurements are proportional to UE velocity. If the velocity is a binary value, the frequency of measurements and the measurement performance would also be two values, but the velocity could also have more steps—which would mean that there would be a scale of values for frequency of measurements and for the measurement performance.

Inter-Frequency/Inter-RAT

According to a feature of an embodiment of the invention, for a given UE each frequency layer of each RAT is assigned an absolute priority. Priority "1" is assigned to the frequency layer and RAT combination that is considered most favourable. Priority "2" is assigned to the frequency layer and RAT combination that is considered the next most favourable, and so on.

The priorities assigned to each UE may be different. The priorities assigned to a particular terminal may change over time, for example in dependence upon the geographical location or in dependence on the configured services.

The embodiment provides a reselection scheme that encourages a UE to select a higher priority frequency layer and RAT combination.

The requirement for the performance/speed of the reselection of a UE from a given frequency/RAT to a lower priority is different than the requirement for the speed of the reselection to a higher priority frequency/RAT.

Mobility of UE

The UE is configured with a profile to be used for each "velocity state"; the following is written assuming that there are two velocity states: stationary and non-stationary, however there could more.

The UE is configured with a profile to be used when stationary (velocity state), and configured with a different profile which it uses when it non-stationary (velocity state). When the UE detects that it is a non-stationary UE it changes from the profile configuration for a stationary UE to a profile configuration for a non-stationary UE. For a particular UE, the stationary profile may include a frequency layer and RAT combination absent from the non-stationary profile. The stationary profile may allocate a different priority to each combination of frequency layer and RAT to that allocated to each combination of frequency layer and RAT by the non-stationary profile. If a frequency layer or a RAT is omitted in a profile, the UE does not measure or reselect to those frequency layer or RATs.

The example differences between the two profile configurations could be such that the UE does not even attempt to camp on a specific frequency layer whilst it is a Non-Stationary UE, e.g. the UE would not attempt to measure a home cell or AP until it is considered a Stationary UE (when non-stationary, the likelihood that the UE will be in the home cell is small, and, even if the UE does occupy the home cell, this will only be for a brief period). To achieve greater battery performance (which is a very important for mobile devices), the frequency of the measurements for the Home cell are advantageously lowered to avoid the UE measuring for the home cell very often when it is unlikely to be suitable. The frequency would need to be balanced against the time to reselect to a home cell.

Another example profile configuration could be that an operator may not want a UE to reselect to a frequency layer which is for the micro/pico cellular layer (which comprises relatively small cells) when a UE is non-stationary, and it would prefer the UE to stay on a frequency layer which has good coverage i.e. 900 MHz, such that the amount of inter-RAT, Inter-frequency and Intra-frequency measurements can be reduced. Therefore, the micro/pico cellular layer would be given a lower priority and the 900 MHz Macro layer would be given a high priority.

Moving Down Priorities

When the Serving Cell on which the UE is camped falls below a network controlled level (SinterSearch) the UE performs measurements of the next priority Frequency Layer or RAT at a small measurement period (Treselection). In this case Treselection is the Period between measurements (samples of the radio). A series of measurements (samples) is taken by the UE and averaged/processed to make a Reliable Measurement. If the period is shorter then the either the Reliable Measurement is more accurate (as more samples are taken), or the Reliable Measurement can be achieved quicker.

If this RAT/Frequency Layer is not available or does not meet the suitability criteria the UE tries the next highest priority RAT/Frequency Layer, and repeats until it finds a frequency layer with suitable cells.

That is, the UE takes measurements of the cells on the next highest priority RAT/Frequency Layer and finds most suitable cell. If the cell is the same RAT and frequency layer as the Serving Cell where the UE is camped, the cells are compared using a Qoffset parameter. If the cell is a different RAT or frequency layer from the Serving Cell where the UE is camped, when the UE falls below an absolute quality level on the Serving Cell and the target cell is above an absolute quality level (specific to the RAT and frequency layer of the target) the UE reselects to the target cell.

A detailed example of a profile configuration for a stationary UE moving down priorities will now be described with reference to the table in Appendix 1.

For the UE different combinations of RAT, frequency layer and whether CSG cells are present are allocated respective priorities, as follows: —

| Priority | RAT | Frequency Band | CSG Cells (Yes/No) |
| --- | --- | --- | --- |
| 1 | LTE (LTE_Freq_1) | 2.6 GHz | Yes |
| 2 | UTRAN (UTRA_Freq_5) | 2 GHz | No |
| 3 | LTE (LTE_Freq_9) | 3.4 GHz | No |
| 4 | LTE (LTE_Freq_1) | 2.6 GHz | No |
| 5 | UTRAN (UTRA_Freq_7) | 2 GHz | No |
| ... | | | |
| n | GSM | 900 MHz | No |

Priorities 1 and 4 relate to the same RAT/frequency layer combination, but the priority 1 is purely for CSG cells where the UE is part of the Closed Subscriber Group (CSG). When the UE is camped on a priority 4 cell it will therefore not search for CSG cells even though they are present on the camped RAT/frequency layer.

A different SinterSearch value may advantageously be provided for each priority. Sintersearch controls whether the UE 1 must make measurements of inter-frequency and inter-RAT cells while camped on a particular "serving cell". If the quality of the serving cell is above Sintersearch, then the UE will not measure other inter-frequency cells and inter-RAT cells while camped. When the quality of the serving cell is equal to or less than the Sintersearch value set for the priority of the serving cell, reselection criteria are applied.

In accordance with a feature of the embodiment, the reselection decision may be based on an absolute comparison, rather than the relative comparison used conventionally. That is, the quality of the serving cell and (if necessary) the quality of the target cell are compared to predetermined thresholds, rather than being compared to each other (as happens conventionally).

Referring to the row corresponding to the priority 1 of the table of Appendix 1, if the quality of the serving cell is equal to or less than the Sintersearch value set for the priority of the serving cell, the reselection criteria are applied. Generally, the first step is to determine whether the quality of the serving cell (RSRP (LTE_Freq_1)) is less than a predetermined value (RSRPreselect,LTE_Freq_1) for at least the measurement period ("Treselection", "y1sec") set for priority 1 cells. This can be expressed as:—

$$RSRP(LTE\_Freq\_1) < RSRPreselect, LTE\_Freq\_1$$

If this criterion is satisfied, then the second step is to determine whether the quality of the target cell having a lower priority is greater than a predetermined threshold value for at least the measurement period ("Treselection", "y1sec") set for priority 1 cells.

Corresponding steps are performed to determine when to reselect from a serving cell of other priority.

The exception to this procedure is when the target cell is in the same RAT and frequency band (Intra-LTE Intra-frequency Band reselection) where the same RAT/frequency band has two different priorities: a first priority ("1") for the RAT/frequency band including CSG cells, and a second priority ("4") for the RAT/frequency band excluding CSG cells. In this instance, the first step is to determine whether the quality of the target cell exceeds the quality of the serving cell by a hysteresis value (Qoffset,RSRP) for at least the measurement period ("Treselection", "y1sec") set for priority 1 cells. This can be expressed as:—

$$RSRP(LTE\_Freq\_1) > RSRP(LTE\_Freq\_1) + Qoffset, RSRP$$

If this relative criterion is satisfied, then a decision is made to select the target cell, which is a priority 4 LTE_Freq_1 cell.

The various second steps (performed after the aforementioned first step is satisfied) will now be described:—

Switch from Priority 1 to Priority 2

If the target cell is on UTRAN (iner-RAT reselection), this second step can be expressed as:—

$$RSCP(UTRAN\ Cell) > RSCPthreshold\_UTRAN\_Freq\_5$$

If the criteria of the first and second steps are satisfied, then a decision is made to select the target cell, which is a priority 2 UTRAN_Freq_5 cell.

Switch from Priority 1 to Priority 3

If the target cell is on a different LTE frequency layer (Intra-LTE, Inter-frequency band), this second step can be expressed as:—

$$RSCP(LTE\_Freq\_9) > RSCPthreshold\_LTE\_Freq\_9$$

If the criteria of the first and second steps are satisfied, then a decision is made to select the target cell, which is a priority 3 LTE_Freq_9 cell.

Switch from Priority 1 to Priority 4

See discussion of the "exception" above.

Switch from Priority 1 to Priority 5

If the target cell is on UMTS (Inter-RAT: to UTRAN reselection), this second step can be expressed as:—

$$RSCP(UTRAN\ Cell) > RSCPthreshold\_UTRAN\_Freq\_7$$

If the criteria of the first and second steps are satisfied, then a decision is made to select the target cell, which is a priority 5 UTRAN cell.

Switch from Priority 1 to Priority n

If the target cell is on GSM (Inter-RAT: to GERAN reselection), this second step can be expressed as:—

$$RLA\_C(GERAN\ Cell) > RLA\_Cthreshold, GERAN$$

If the criteria of the first and second steps are satisfied, then a decision is made to select the target cell, which is a priority n GSM cell.

The RSCPthreshold/RLA_Cthreshold values are target RAT/frequency layer threshold values, and may be different for each RAT/frequency layer—to provide optimum performance according to the circumstances.

The second steps above are performed in priority order. When the highest priority second step is satisfied, reselection occurs. The lower priority second steps are not performed.

In addition to these decisions based on the "reselection criteria" further "selection criteria" are applied, as specified in the table. The "selection criteria" are the criteria which indicate the serving cell is no longer considered appropriate for use as the radio quality has fallen too far (in this example, below threshold value RSRPthreshold,LTE_Freq_1). The UE then triggers cell selection—and considers itself out of coverage—periodically searching all allowed layers until finds a cell where the radio quality is above the Selection criteria for that cell/frequency/technology.

The "selection criteria" are set in relation to the "reselection criteria" such that the "selection criteria" are normally only triggered when no other (allowed) coverage is available.

In the example described above, the serving cell is a priority 1 cell.

If the serving cell is different priority cell, corresponding steps are taken and thresholds applied to determine when to reselect a lower priority cell, as shown in the table of appendix 1.

The procedure can be summarised as follows. If the UE is on priority m and the radio quality is reasonable i.e. above the SinterSearch criteria, the UE need not measure priority layers greater than m. If the quality of the radio falls, when it falls below the SinterSearch threshold associated with the priority layer m, the UE starts searching for selecting down the priority list i.e. searching for cells of a layer with priority m+l, where l is a positive integer, the UE would first start searching for l=1 and scroll until l=max.

Moving Up Priorities

When the UE is no longer on the preferred (priority 1) RAT/Frequency Layer, the UE performs measurements to ascertain whether a higher priority RAT/Frequency Layer is available. It is proposed that this be completed at a low period (Tmeasurement_long); e.g. the UE has a reaction time in the order of 10s of seconds. However, this period is controlled and may be varied by the operator. "Tmeasurement_long" defines how frequently the UE searches for the higher priority layer. An "accurate measurement" is an average of a series of measurements, and the period Tmeasurement_long indicates the period between measurement (samples) and is proportional to the time taken to achieve an "accurate measurement".

If the UE finds a suitable RAT/Frequency Layer the UE then checks that this is the most suitable RAT/Frequency Layer by completing fast measurements of the higher priority RAT/Frequency Layer.

The UE compares the measurements of the higher priority RAT/Frequency Layer against as minimum Suitability Criteria for that RAT/Frequency Layer+Hysteresis.

Advantageously, the hysteresis is proportional to the number of times the UE has reselected to that RAT in the last x minutes ("Tpingpong" period) or has performed a required number of cell changes within a frequency layer. So to avoid the UE constantly moving to a higher priority layer and the reselecting back the hysteresis increases, keeping the UE on the lower priority RAT, i.e. by making it more "sticky".

The formula to calculate the hysteresis to be applied to the lower priority RAT may be:

Hyst=min{alpha*(num_reselection);hyst_max}

And it should ensure the hysteresis size increases linearly initially and then saturates to a certain point. The step size (alpha) of the hysteresis and the hyst_max should be controlled by the network operator.

It is assumed that the memory of the hysteresis would be limited (i.e. by a timer (i.e. Tpingpong)) or by a number of cell changes within one technology) and then reset to the original value to avoid the UE remaining at hyst_max once it reaches this level. If a timer is used it is assumed to be in the order of 5 mins, but it would be under control of operator.

A detailed example of a profile configuration for a stationary UE moving up priority will now be described with reference to the table in Appendix 2.

The same priorities 1 . . . n as discussed above are available.

The value Tmeasurement_long may be different for each priority.

Referring to the row corresponding to priority 2 of the table in Appendix 2, for a UE camped on a priority 2 serving cell, once every Tmeasurement_long period the UE compares the measurements of the higher priority 1 RAT/Frequency Layer against a minimum Suitability Criteria for that RAT/Frequency Layer (a threshold value+Hysteresis). This can be expressed as:—

RSRP(LTE_Freq_1)>RSRPthreshold,LTE_Freq_1+ Qhyst,LTE_Freq_1

If the suitability criteria are met, then a decision is made to select the target cell, which is a priority 1 LTE cell.

The same comparison is performed by a UE camped on a priority 3 serving cell. If the suitability criteria are met, then a decision is made to select the target cell, which is a priority 1 LTE cell. If the suitability criteria are not met for the priority 1 LTE cell, once every Tmeasurement_long period the UE compares the measurements of the higher priority 2 RAT/Frequency Layer against a minimum Suitability Criteria for that RAT/Frequency Layer+Hysteresis. This can be expressed as:—

RSCP(UTRAN Cell_Freq_5))>RSCPthreshold_UTRAN_Freq_5+Qhyst,UTRAN_Freq_5

If the suitability criteria are met, then a decision is made to select the target cell, which is a priority 2 UTRA_Freq_5 cell.

As shown by the table, the pattern continues for lower priority cells. For a cell with a priority m, once every Tmeasurement_long period (for priority m) the UE compares the measurements of each higher priority (starting with the highest priority first) RAT/Frequency Layer against a minimum Suitability Criteria for that RAT/Frequency Layer (a threshold value for priority m+Hysteresis). If the suitability criteria are met, then a decision is made to select the target cell, which has a priority.

The Tmeasurement_long period may be different for each priority to optimise reselection according to the circumstances. The Hysteresis value (Qhyst) may be different for each priority to optimise reselection according to the circumstances, and many change in the manner described above. The threshold value (RSCPthreshold/RSRPthreshold) may be different for each priority to optimise reselection according to the circumstances.

Non-Stationary UE

In the discussion above in relation to the tables of Appendices 1 and 2, the priorities allocated and the alpha, hyst_max, Tmeasurement_long, SinterSearch, Treselection and Selection criteria values are for a stationary UE.

Priority 1 is accorded to LTE RAT with CSG because this will generally provide the most and fastest services to a UE that is stationary, so this RAT with CSG should be selected when available. The lowest priority, n, is GSM RAT as this generally provides the fewest services.

However, if the UE is moving a different RAT may be preferred, and may therefore be given priority 1. For example, GSM or UMTS RAT may be allocated priority 1 for a moving terminal and this provides the most consistent service to a moving terminal. LTE may be allocated a lower priority for a moving terminal as the service is inconsistent for a moving terminal. The priorities are selected according to the circumstances.

For a moving terminal, the alpha, hyst_max, Tmeasurement_long, SinterSearch, Treselection and Selection criteria values for each priority may also be different to optimise performance for a moving terminal.

Comparison with HCS

General

The HCS concept was defined for GSM and 3G, and has not been included for LTE.

For GSM/GPRS the concept is that the network is split into layers of different cell size: large, small and Micro cells.

For GSM HCS is described in 3GPP TS 45.022:

For Idle mode UEs HCS is implemented by introducing different offsets when comparing signal strengths of different neighbour cells. Also the network signals a timer value to all UEs in the System Information broadcast, which tells the UE not to consider a new cell for reselection for a set period of time (set by the timer), so when UE is moving a small cell would appear and disappear before the expiry of this timer and therefore never be considered for cell reselection.

Mainly HCS is about Active mode UEs, where the network controls the layer which the UE is using.

For GPRS some aspects of HCS are in 3GPP TS 45.008:

For GPRS before Rel-6 the UE is control of its own mobility, even when transmitting data, so a new MS centric scheme was introduced.

Each cell and each of its neighbour cells is given a priority class between 1 and 15.

The UE performs a ranking procedure of neighbour cells—which is based on relative received signal strength of the neighbour cells, and:

If a neighbour cell is a higher priority an additional offset is applied to make the cell more likely to be reselected . . . however two neighbour cells of different higher priority will be given the same offset.

So the terminal may first select the cell which is not the highest priority, before jumping again to another cell which is higher priority than the new cell (as the offset would again apply).

For 3G HCS is mostly defined in 3GPP TS 25.304:

The UE functionality is grouped between those which are considered High-mobility and those which are not. This is either based on a high number of cell changes, or on network signalling.

The cells are each given a HCS priority.

When a UE is NOT considered high mobility:

UEs should always search for cells with higher priority then the current cell.

If the signal strength of the serving cell falls below a signalled level, then the UE measures cells on its own frequency as well as higher priority.

If the signal strength of the serving cell falls to an even lower level, the UE measures all cells.

However when it is considered high-mobility:

The UE searches for Lower priority cells.

Difference Between the 3G HCS Approach and this Proposal:

The HCS is about cells, and not about frequency bands—although it could be configured in that way.

For the HCS solution cells within the same frequency bands are compared using an offset, whereas the proposal does not compare the cells of different carriers using an offset—it is an absolute value . . . if it is higher priority and it is of adequate quality go to it.

Two higher priority cells are not treated equally, which is the case for the HCS—and therefore this may cause the UE to jump between multiple layer before it finds the correct layer.

The mobility causes the HCS to be flipped, whereas the proposal is that the layer priority order and parameters could be completely modified. Also introduces the ability for the network to configure a UE to stop looking for a layer when it is moving.

The proposal is UE specific (based on mobility, Service, Subscription etc), whereas HCS is about the system and any UEs configured to be HCS follow the same approach and only modify for mobility—in a basic way.

Introduces the concept of a long period between searches of higher priority layers. Also introduces concept of configurable parameter to set the period for each layer and for each UE.

the proposal would be location specific . . . allowing the network to give a UE a new configuration for use in a Tracking Area.

Modifications

In the embodiment, the mobility state is whether the mobile terminal is stationary or non-stationary (moving). The priority allocated to each frequency layer/RAT combination may be varied according to additional or alternative mobility states—e.g. slow moving and fast moving.

The priority of each RAT/frequency layer combination could be varied in accordance with other factors instead of or in addition to mobility state.

For example, the priority of each RAT/frequency layer combination could be varied in accordance with geographical location, so that when in a rural location macro cells (e.g. GSM 900 cells) were given a high priority because LTE cells are unlikely to provide good coverage. Also, if a UE is a member of a CSG, the RAT/frequency layer combination containing the CSG may only be included in the priority list for the UE when in the area occupied by the CSG. The geographical location may be determined by detecting the Routing Area, Location Area or Tracking Area.

The priority of each RAT/frequency layer combination could be varied in accordance with the characteristics of the UE, so a terminal with a less powerful user interface gives GSM cells a relatively high priority as high speed data services are unlikely to be used.

The priority of each RAT/frequency layer combination could be varied in accordance with the usage history of the UE, so a terminal which makes extensive use of high speed data services gives GSM cells a relatively low priority as high speed data services are likely to be used.

It should be appreciated that the values shown in the tables are examples only, illustration the principle of the invention. Which RAT/frequency layer combination is allocated to which priority will vary according to the circumstances.

The priority of each RAT/frequency layer combination could be varied for each UE. A UE which is not a member of the CSG would not include the CSG cells in its resection process, so in the example of the table of appendix 1, priority 1 would be omitted. Priority 4 may be made priority 1 for such a terminal.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

APPENDIX 1 stationary UE

| Priority | RAT | Frequency Band | CSG Cells measurements (Yes/No) | Search Criteria (i.e. Trigger to start Inter-Freq/Inter-RAT) SinterSearch | Measurement Period (Treselection) | Reselection Criteria - Relative (Intra-RAT)/Absolute (Inter-RAT) Threshold (dB/dBm) | Selection Criteria (i.e. Serving Cell no longer suitable) threshold |
|---|---|---|---|---|---|---|---|
| 1 | LTE (LTE_Freq_1) | 2.6 GHz | Yes | ? dBm | y1 sec | SWITCH FROM PRIORITY 1 TO PRIORITY 2<br>Absolute comparison - Inter-RAT: to UTRAN<br>If RSRP (LTE_Freq_1) < RSRPreselect,LTE_Freq_1<br>AND<br>If RSCP (UTRAN Cell) > RSCPthreshold_UTRAN_Freq_5<br>THEN SELECT UTRAN (PRIORITY 2)<br>SWITCH FROM PRIORITY 1 TO PRIORITY 3<br>Absolute comparison - Intra-LTE, Inter-frequency band:<br>If RSRP (LTE_Freq_1) < RSRPreselect,LTE_Freq_1<br>AND<br>If RSCP (LTE_Freq_9) > RSCPthreshold_LTE_Freq_9<br>THEN SELECT LTE_Freq_9 (PRIORITY 3)<br>SWITCH FROM PRIORITY 1 TO PRIORITY 4<br>Relative comparison - Intra-LTE Intra-frequency Band:<br>If RSRP (LTE_Freq_1) > RSRP (LTE_Freq_1) + Qoffset,RSRP<br>THEN SELECT LTE_Freq_1 (PRIORITY 4)<br>SWITCH FROM PRIORITY 1 TO PRIORITY 5<br>Absolute comparison - Inter-RAT: to UTRAN<br>If RSRP (LTE_Freq_1) < RSRPreselect,LTE_Freq_1<br>AND<br>If RSCP (UTRAN Cell) > RSCPthreshold_UTRAN_Freq_7<br>THEN SELECT UTRAN (PRIORITY 5)<br>SWITCH FROM PRIORITY 1 TO PRIORITY n<br>Absolute comparison - Inter-RAT: to GERAN<br>If RSRP (LTE_Freq_1) < RSRPreselect,LTE AND<br>If RLA_C (GERAN Cell) > RLA_Cthreshold,GERAN<br>THEN SELECT GSM (PRIORITY n) | RSRPthreshold, LTE_Freq_1 = ? dBm |
| 2 | UTRAN (UTRA_Freq_5) | 2 GHz | N | ? dBm | y2 sec | SWITCH FROM PRIORITY 2 TO PRIORITY 3<br>Absolute comparison - Inter-RAT: to LTE<br>If RSRP (UTRAN Cell) < RSCPthreshold_UTRAN<br>AND<br>If RSCP (LTE_Freq_9) > RSRPreselect,LTE<br>THEN SELECT LTE_Freq_9 (PRIORITY 3) | RSCPthreshold_UTRAN_Freq_5 = ? dBm |

APPENDIX 1-continued stationary UE

| Priority | RAT | Frequency Band | CSG Cells (Yes/No) | Search Criteria (i.e. Trigger to start Inter-Freq/Inter-RAT measurements) SinterSearch | Measurement Period (Treselection) | Reselecting Down Priority List Reselection Criteria - Relative (Intra-RAT)/Absolute (Inter-RAT) Threshold (dB/dBm) | Selection Criteria (i.e. Serving Cell no longer suitable) threshold |
|---|---|---|---|---|---|---|---|
| 3 | LTE (LTE_Freq_9) | 3.4 GHz | No | ? dBm | y6 sec | SWITCH FROM PRIORITY 2 TO PRIORITY 4 Absolute comparison - Inter-RAT: to LTE If RSRP (UTRAN Cell) < RSCPthreshold_UTRAN_Freq_5 AND If RSCP (LTE_Freq_1) > RSRPreselect,LTE_Freq_1 THEN SELECT LTE_Freq_1 (PRIORITY 4) SWITCH FROM PRIORITY 2 TO PRIORITY 5 Absolute comparison - Intra-RAT: UTRAN Intra-frequency If RSRP (UTRA_Freq_5) < RSRPreselect,UTRA_Freq_5 AND If RSCP (UTRAN Cell) > RSCPthreshold_UTRAN_Freq_7 THEN SELECT UTRAN (PRIORITY 5) SWITCH FROM PRIORITY 2 TO PRIORITY n? Absolute comparison - Inter-RAT: to GERAN If RSRP (UTRAN Cell_Freq_5) < RSCPthreshold_UTRA_Freq_5 AND If RLA_C (GERAN Cell) > RLA_Cthreshold,GERAN THEN SELECT GSM (PRIORITY n) SWITCH FROM PRIORITY 3 TO PRIORITY 4 Absolute comparison - Intra-LTE, Inter-frequency band: If RSRP (LTE_Freq_9) < RSRPreselect,LTE_Freq_9 AND If RSCP (LTE_Freq_1) > RSCPthreshold_LTE_Freq_1 THEN SELECT LTE_Freq_1 (PRIORITY 4) SWITCH FROM PRIORITY 3 TO PRIORITY 5 Absolute comparison - Inter-RAT: to UTRAN If RSRP (LTE_Freq_9) < RSRPreselect,LTE_Freq_9 AND If RSCP (UTRAN Cell) > RSCPthreshold_UTRA_Freq_7 THEN SELECT UTRAN (PRIORITY 5) SWITCH FROM PRIORITY 3 TO PRIORITY n? Absolute comparison - Inter-RAT: to GERAN If RSRP (LTE_Freq_2) > RSRPreselect,LTE_Freq_2 AND If RLA_C (GERAN Cell) > RLA_Cthreshold,GERAN THEN SELECT GSM (PRIORITY n) | RSRPreselect, LTE_Freq_9 = ? dBm |

APPENDIX 1-continued stationary UE

| Priority | RAT | Frequency Band | CSG Cells measurements (Yes/No) | Search Criteria (i.e. Trigger to start Inter-Freq/Inter-RAT) SinterSearch | Measurement Period (Treselection) | Reselecting Down Priority List — Reselection Criteria - Relative (Intra-RAT)/Absolute (Inter-RAT) Threshold (dB/dBm) | Selection Criteria (i.e. Serving Cell no longer suitable) threshold |
|---|---|---|---|---|---|---|---|
| 4 | LTE (LTE_Freq_1) | 2.6 GHz | No | ? dBm | y6 sec | SWITCH FROM PRIORITY 4 TO PRIORITY 5 Absolute comparison - Inter-RAT: to UTRAN If RSRP (LTE_Freq_1) < RSRPreselect,LTE_Freq_1 AND If RSCP (UTRAN Cell_Freq_7) > RSCPthreshold_UTRA_Freq_7 THEN SELECT UTRAN (PRIORITY 5) SWITCH FROM PRIORITY 4 TO PRIORITY n? Absolute comparison - Inter-RAT: to GERAN If RSRP (LTE_Freq_1) < RSRPreselect,LTE_Freq_1 AND If RLA_C (GERAN Cell) > RLA_Cthreshold,GERAN THEN SELECT GSM (PRIORITY n) | RSRPreselect, LTE_Freq_1 = ? dBm |
| 5 | UTRAN (UTRA_Freq_7) | 2 GHz | No | ? dBm | y2 sec | SWITCH FROM PRIORITY 5 TO PRIORITY n? Absolute comparison - Inter-RAT: to GERAN If RSRP (UTRA_Freq_7) < RSRPreselect,UTRA_Freq_7 AND If RLA_C (GERAN Cell) > RLA_Cthreshold,GERAN THEN SELECT GSM (PRIORITY n) | RSCPthreshold_UTRA_Freq_7 = ? dBm |
| n | GSM | 900 MHz | No | | | | |

APPENDIX 2 stationary UE

| Priority | RAT | Frequency Band | CSG Cells (Yes/No) | Measurement Period (Tmeasurment_long) | Reselection Criteria Relative (Intra-RAT)/Absolute (Inter-RAT) Threshold (dB/dBm) | Reselecting Up Priority List | Qhyst Initial Hysteresis | Hysteresis Step Size |
|---|---|---|---|---|---|---|---|---|
| 1 | LTE (LTE_Freq_1) | 2.6 GHz | Yes | | | | | |
| 2 | UTRAN (UTRA_Freq_5) | 2 GHz | N | x1 sec | SWITCH FROM PRIORITY 2 TO PRIORITY 1?<br>Absolute comparison - Inter-RAT: to LTE:<br>If RSRP (LTE_Freq_1) > RSRPthreshold,LTE_Freq_1 + Qhyst,LTE_Freq_1<br>THEN SELECT LTE_Freq_1 (PRIORITY 1) | | 3 dB | 3 dB |
| 3 | LTE (LTE_Freq_9) | 3.4 GHz | No | x2 sec | SWITCH FROM PRIORITY 3 TO PRIORITY 1?<br>Absolute comparison - Intra-LTE Inter-frequency:<br>If RSRP (LTE_Freq_1) > RSRPthreshold,LTE_Freq_1 + Qhyst,LTE_Freq_1<br>THEN SELECT LTE_Freq_1 (PRIORITY 1)<br>SWITCH FROM PRIORITY 3 TO PRIORITY 2?<br>Absolute comparison - Inter-RAT: to UTRAN<br>If RSCP (UTRAN Cell_Freq_5) ><br>RSCPthreshold_UTRAN_Freq_5 + Qhyst,UTRAN_Freq_5<br>THEN SELECT UTRA_Freq_5 (PRIORITY 2) | | 3 dB | |
| 4 | LTE (LTE_Freq_1) | 2.6 GHz | No | x3 sec | SWITCH FROM PRIORITY 4 TO PRIORITY 1?<br>Absolute comparison - Intra-LTE Intra-frequency Band:<br>If RSRP (LTE_Freq_1) > RSRPthreshold,LTE_Freq_1 + Qhyst,LTE_Freq_1<br>THEN SELECT LTE_Freq_1 (PRIORITY 1)<br>SWITCH FROM PRIORITY 4 TO PRIORITY 2?<br>Absolute comparison - Inter-RAT: to UTRAN<br>If RSCP (UTRAN Cell_Freq_5) ><br>RSCPthreshold_UTRAN_Freq_5 + Qhyst,UTRAN_Freq_5<br>THEN SELECT UTRA_Freq_5 (PRIORITY 2)<br>SWITCH FROM PRIORITY 4 TO PRIORITY 3?<br>Absolute comparison - Intra-LTE Inter-frequency<br>If RSRP (LTE_Freq_9) > RSRPthreshold,LTE_Freq_9 + Qhyst,LTE_Freq_9<br>THEN SELECT LTE_Freq_9 (PRIORITY 3) | | 3 dB | 3 dB |
| 5 | UTRA_Freq_7 | 2 GHz | No | x4 sec | SWITCH FROM PRIORITY 5 TO PRIORITY 1?<br>Absolute comparison - Inter-RAT to LTE:<br>If RSRP (LTE_Freq_1) > RSRPthreshold,LTE_Freq_1 + Qhyst,LTE_Freq_1<br>THEN SELECT LTE_Freq_1 (PRIORITY 1)<br>SWITCH FROM PRIORITY 5 TO PRIORITY 2?<br>Absolute comparison - Intra-RAT: Inter-frequency<br>If RSCP (UTRAN Cell_Freq_5) ><br>RSCPthreshold_UTRAN_Freq_5 + Qhyst,UTRAN_Freq_5<br>THEN SELECT UTRA_Freq_5 (PRIORITY 2) | | 3 dB | 3 dB |

APPENDIX 2-continued stationary UE

| Priority | RAT | Frequency Band | CSG Cells (Yes/No) | Measurement Period (Tmeasurment_long) | Reselection Criteria | Reselecting Up Priority List Relative (Intra-RAT)/Absolute (Inter-RAT) Threshold (dB/dBm) | Initial Hysteresis | Qhyst Hysteresis Step Size |
|---|---|---|---|---|---|---|---|---|
| | | | | | | SWITCH FROM PRIORITY 5 TO PRIORITY 3? Absolute comparison - Inter-RAT: to LTE If RSRP (LTE_Freq_9) > RSRPthreshold,LTE_Freq_9 + Qhyst,LTE_Freq_9 THEN SELECT LTE_Freq_9 (PRIORITY 3) SWITCH FROM PRIORITY 5 TO PRIORITY 4? Absolute comparison - Inter-RAT: to LTE If RSRP (LTE_Freq_1) > RSRPthreshold,LTE_Freq_1 + Qhyst, LTE_Freq_1 THEN SELECT LTE_Freq_1 (PRIORITY 4) | | |
| n | GSM | 900 MHz | No | xn sec | SWITCH FROM PRIORITY n TO PRIORITY 1? Absolute comparison - Inter-RAT to LTE: If RSRP (LTE_Freq_1) > RSRPthreshold,LTE_Freq_1 + Qhyst,LTE_Freq_1 THEN SELECT LTE_Freq_1 (PRIORITY 1) SWITCH FROM PRIORITY 5 TO PRIORITY 2? Absolute comparison - Inter-RAT: to UTRAN If RSCP (UTRAN Cell_Freq_5) > RSCPthreshold_UTRAN_Freq_5 + Qhyst,UTRAN_Freq_5 THEN SELECT UTRA_Freq_5 (PRIORITY 2) SWITCH FROM PRIORITY 5 TO PRIORITY 3? Absolute comparison - Inter-RAT: to LTE If RSRP (LTE_Freq_9) > RSRPthreshold,LTE_Freq_9 + Qhyst,LTE_Freq_9 THEN SELECT LTE_Freq_9 (PRIORITY 3) SWITCH FROM PRIORITY n TO PRIORITY 4? Absolute comparison - Inter-RAT: to LTE If RSRP (LTE_Freq_1) > RSRPthreshold,LTE_Freq_1 + Qhyst, LTE_Freq_1 THEN SELECT LTE_Freq_1 (PRIORITY 4) SWITCH FROM PRIORITY n TO PRIORITY 5? Absolute comparison - Inter-RAT: to UTRAN If RSCP (UTRAN Cell_Freq_7) > RSCPthreshold_UTRAN_Freq_7 + Qhyst,UTRAN_Freq_7 THEN SELECT UTRAN_Freq_7 (PRIORITY 5) | 3 dB | 3 dB |

The invention claimed is:

1. A base station reselection method for a mobile terminal camped on a serving base station, which mobile terminal performs a cell reselection function in accordance with reselection parameters, the method comprising:
   determining a mobility state related to a rate of movement of the mobile terminal;
   determining a prioritization profile for the mobile terminal which accords a at least one priority to respective radio resources of a plurality of different radio resources, the prioritization profile determination being dependent upon the mobility state of the mobile terminal;
   taking measurements of reselection parameters for one or more radio resources listed in the determined prioritization profile;
   comparing a first threshold with the measured reselection parameters for the one or more radio resources sequentially according to the determined prioritization profile until at least one of the measured reselection parameters for a given radio resource exceeds the first threshold; and
   when the at least one of the measured reselection parameters exceeds the first threshold, reselecting to the given radio resource.

2. The method of claim 1, wherein the radio resources include respective frequency layers.

3. The method of claim 1, wherein the radio resources include respective radio access technologies.

4. The method of claim 2, wherein each of the radio resources includes a frequency layer and radio access technology combination.

5. A mobile terminal which camps on a serving base station in use and which mobile terminal performs a cell reselection function in accordance with reselection parameters, the mobile terminal comprising:
   a computer that:
      determines a mobility state that relates to a rate of movement of the mobile terminal;
      determines a prioritization profile for the mobile terminal which accords at least one priority to respective radio resources of a plurality of different radio resources, the prioritization profile determination being dependent upon the mobility state of the mobile terminal;
      takes measurements of reselection parameters for one or more radio resources listed in the determined prioritization profile;
      compares a first threshold with the measured reselection parameters for the one or more radio resources sequentially according to the determined prioritization profile until at least one of the measured reselection parameters for a given radio resource exceeds the first threshold; and
      when the at least one of the measured reselection parameters exceeds the first threshold, reselects to the given radio resource.

6. The mobile terminal of claim 5, wherein the radio resources include respective frequency layers.

7. The mobile terminal of claim 5, wherein the radio resources include respective radio access technologies.

8. The mobile terminal of claim 6, wherein each of the radio resources includes a frequency layer and radio access technology combination.

9. The method of claim 1, wherein the first threshold is an absolute threshold selected in dependence upon at least one priority accorded to the one or more resources of the determined prioritization profile.

10. The method of claim 1, wherein the priority of the given radio resource is lower than a priority associated with the serving base station in the determined prioritization profile, and wherein the method further comprises:
   comparing measured reselection parameters for the serving base station with a second absolute threshold;
   reselecting to the given radio resource where at least one of the measured reselection parameters of the given radio resource exceeds the first threshold and at least one of the measured reselection parameters of the serving base station is equal to or less than the second absolute threshold.

11. The method of claim 1, further comprising:
   causing the mobile terminal to commence the cell reselection function where a quality of the serving base station is equal to or less than a first quality value, the first quality value being set in dependence upon a priority associated with the serving base station.

12. The method of claim 1, wherein the priority of the given radio resource is higher than a priority associated with the serving base station, and wherein the method further comprises:
   reselecting to the given radio resource when the at least one of the measured reselection parameters of the given radio resource exceeds the first threshold, wherein the first threshold includes a hysteresis value which is variable in dependence upon a frequency with which the given radio resource has been selected by the mobile terminal within a preceding time period.

13. The method of claim 12, further comprising:
   the mobile terminal searching for a higher priority radio resource at a frequency which depends on the priority associated with the serving base station.

14. The mobile terminal of claim 5, wherein the first threshold is an absolute threshold selected in dependence upon at least one priority accorded to the one or more resources of the determined prioritization profile.

15. The mobile terminal of claim 5, wherein the priority of the given radio resource is lower than a priority associated with the serving base station in the determined prioritization profile, and wherein the computer is further configured to:
   compare measured reselection parameters for the serving base station with a second absolute threshold;
   reselect to the given radio resource where at least one of the measured reselection parameters of the given radio resource exceeds the first threshold and at least one of the measured reselection parameters of the serving base station is equal to or less than the second absolute threshold.

16. The mobile terminal of claim 5, wherein the computer is further configured to:
   cause the mobile terminal to commence the cell reselection function where a quality of the serving base station is equal to or less than a first quality value, the first quality value being set in dependence upon a priority associated with the serving base station.

17. The mobile terminal of claim 5, wherein the priority of the given radio resource is higher than a priority associated with the serving base station, and wherein the computer is further configured to:
   reselect to the given radio resource when the at least one of the measured reselection parameters of the given radio resource exceeds the first threshold, wherein the first threshold includes a hysteresis value which is variable in dependence upon a frequency with which the given radio resource has been selected by the mobile terminal within a preceding time period.

18. The mobile terminal of claim 17, wherein the computer is further configured to:
   search for a higher priority radio resource at a frequency which depends on the priority associated with the serving base station.

* * * * *